US012669991B2

(12) United States Patent
Zhao et al.

(10) Patent No.: US 12,669,991 B2
(45) Date of Patent: Jun. 30, 2026

(54) RECOMMENDING USER FEEDBACK WITH AUTOMATIC SCORING AND REASONING

(71) Applicant: International Business Machines Corporation, Armonk, NY (US)

(72) Inventors: Rong Zhao, Beijing (CN); Yun Zhang, Beijing (CN); Ya Wei Niu, Beijing (CN); Chen Li, Dezhou (CN); David Shao Chung Chen, Taipei City (TW)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 18/508,381

(22) Filed: Nov. 14, 2023

(65) Prior Publication Data

US 2025/0156172 A1     May 15, 2025

(51) Int. Cl.
*G06F 8/65* (2018.01)

(52) U.S. Cl.
CPC ...................................... *G06F 8/65* (2013.01)

(58) Field of Classification Search
None
See application file for complete search history.

(56) References Cited

U.S. PATENT DOCUMENTS

| | | | | |
|---|---|---|---|---|
| 8,725,773 | B2 | 5/2014 | Pettit | |
| 11,010,797 | B2 | 5/2021 | Dow | |
| 12,149,493 | B1 * | 11/2024 | Hraka | H04L 51/216 |
| 12,155,532 | B1 * | 11/2024 | Garcarz | H04L 41/16 |
| 12,164,943 | B1 * | 12/2024 | Mahmud | G06F 3/0482 |
| 2013/0191180 | A1 * | 7/2013 | Teo | G06Q 30/02 |
| | | | | 705/7.32 |
| 2018/0316636 | A1 * | 11/2018 | Kamat | H04L 51/046 |
| 2019/0156358 | A1 | 5/2019 | Pace | |
| 2022/0334790 | A1 * | 10/2022 | Lawrence | G06F 3/1454 |
| 2024/0070755 | A1 * | 2/2024 | Axelsson | G06F 16/22 |
| 2024/0104479 | A1 * | 3/2024 | Bansal | G06F 8/71 |

(Continued)

FOREIGN PATENT DOCUMENTS

| | | | | |
|---|---|---|---|---|
| CN | 114092123 A | 2/2022 | | |
| CN | 113778435 B | * 6/2024 | ......... | G06F 16/9566 |

(Continued)

OTHER PUBLICATIONS

Disclosed Anonymously, "A Method of Net Promoter Score of Product Features based on User Behavior", An IP.com Prior Art Database Technical Disclosure, IP.com No. IPCOM000270412D, IP.com Electronic Publication Date: Jul. 3, 2022, 5 Pages.

(Continued)

*Primary Examiner* — Philip Wang
(74) *Attorney, Agent, or Firm* — James L. Olsen

(57) ABSTRACT

According to one embodiment, a method, computer system, and computer program product for recommending feedback for a feedback form is provided. The embodiment may include collecting data about a user's experience of an application. The embodiment may also include analyzing the collected data to determine one or more suggested responses to one or more questions in a feedback form. The embodiment may further include preparing the feedback form for the user based on the suggested responses. The embodiment may also include presenting the prepared feedback form to the user.

5 Claims, 3 Drawing Sheets

(56) References Cited

U.S. PATENT DOCUMENTS

| | | | | |
|---|---|---|---|---|
| 2024/0137293 A1* | 4/2024 | Mermoud | ........... | H04L 41/5025 |
| 2024/0202755 A1* | 6/2024 | Hebling | ............. | G06Q 30/0282 |
| 2024/0420189 A1* | 12/2024 | Vajjiparti | ................ | G06F 9/451 |
| 2025/0108306 A1* | 4/2025 | Xiong | ................... | A63F 13/497 |

FOREIGN PATENT DOCUMENTS

| | | | | | |
|---|---|---|---|---|---|
| KR | 20240088132 A | * | 6/2024 | ............. | A61B 5/165 |
| WO | 2020234419 A1 | | 11/2020 | | |
| WO | WO-2024111791 A1 | * | 5/2024 | ............. | G06Q 50/10 |

OTHER PUBLICATIONS

Disclosed Anonymously, "An Optimal Pop-up Time Method for Questionnaire based on User Behavior Analysis of Data Analysis Application", An IP.com Prior Art Database Technical Disclosure, IP.com No. IPCOM000268908D, IP.com Electronic Publication Date: Mar. 8, 2022, 7 Pages.

Disclosed Anonymously, "System and methods for identifying end-user usage behaviour to improve software design decisions", An IP.com Prior Art Database Technical Disclosure, IP.com No. IPCOM000261887D, IP.com Electronic Publication Date: Apr. 15, 2020, 8 Pages.

Liu et al., "An improved weighted fusion algorithm of multi-sensor", Journal of Physics: Conference Series, vol. 1453, 2nd International Conference on Computer Information Science and Artificial Intelligence (CISAI 2019), Xi'an, China, Oct. 25-27, 2019, 8 Pages.

Shao et al., "An Improved Multisensor Self-Adaptive Weighted Fusion Algorithm Based on Discrete Kalman Filtering", Hindawi, Complexity, vol. 2020, Article ID 9673764, 9 Pages.

* cited by examiner

100

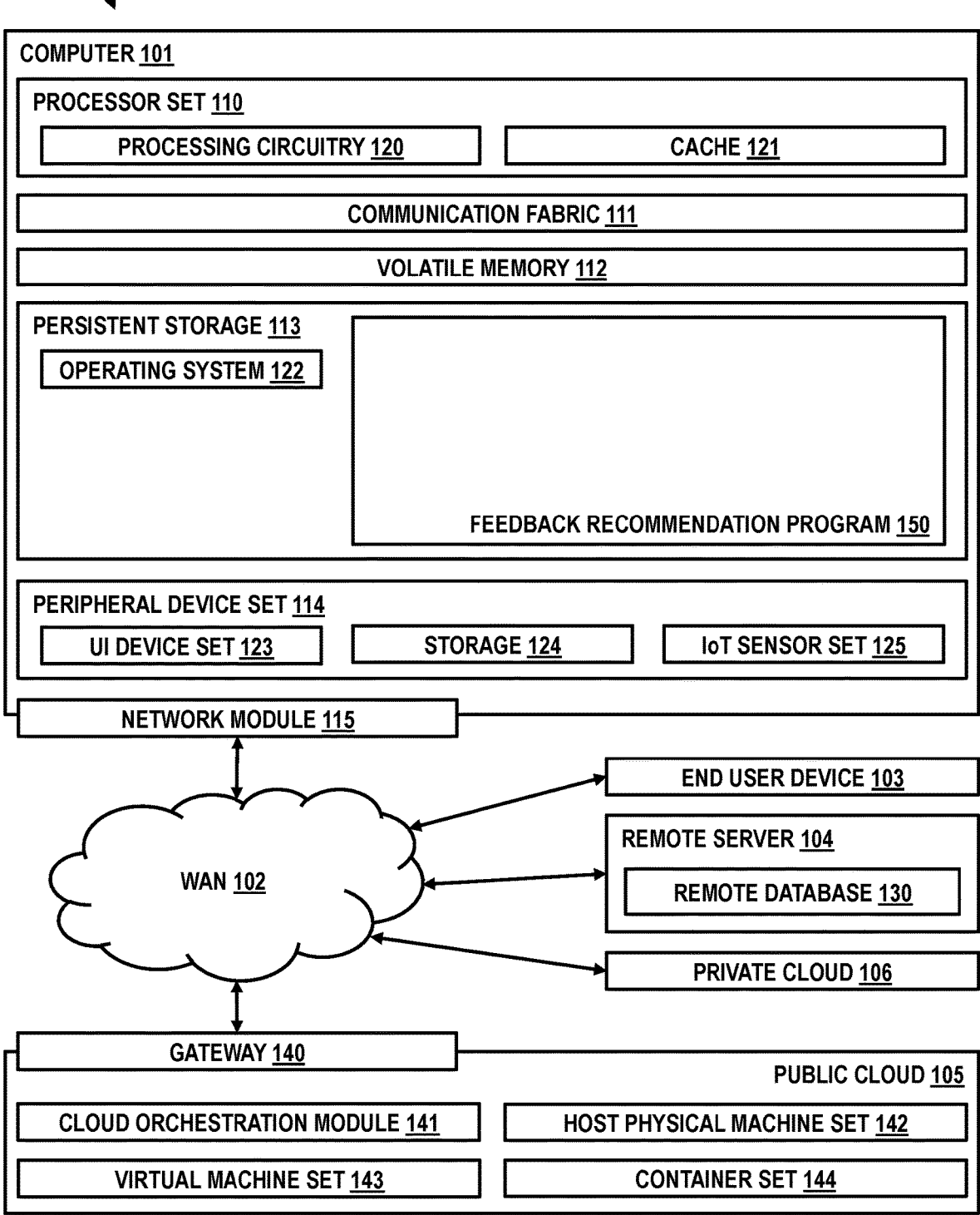

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122

FEEDBACK RECOMMENDATION PROGRAM 150

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

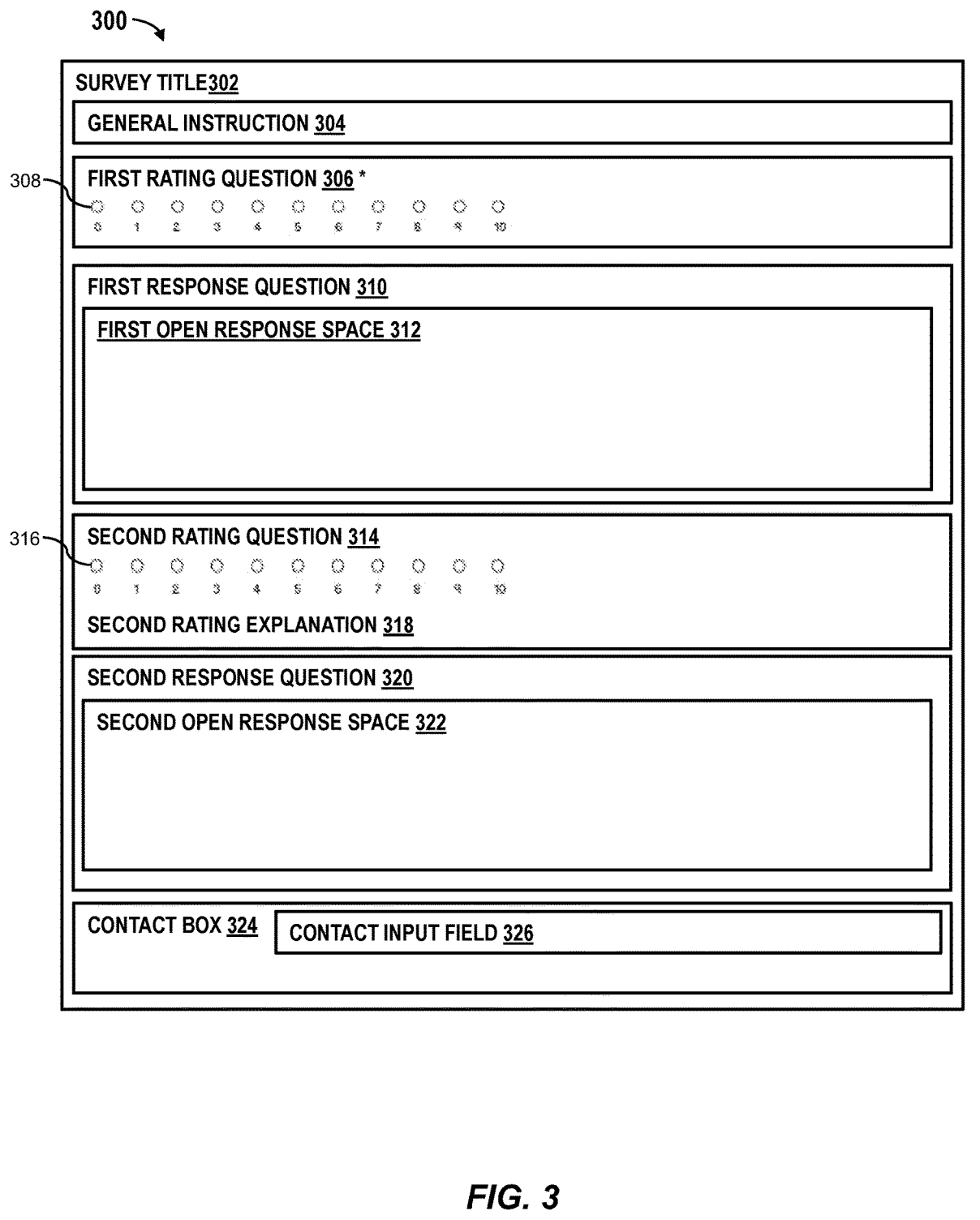

SURVEY TITLE <u>302</u>

GENERAL INSTRUCTION <u>304</u>

308 — FIRST RATING QUESTION <u>306</u> *

○ ○ ○ ○ ○ ○ ○ ○ ○ ○ ○
0   1   2   3   4   5   6   7   8   9   10

FIRST RESPONSE QUESTION <u>310</u>

<u>FIRST OPEN RESPONSE SPACE 312</u>

316 — SECOND RATING QUESTION <u>314</u>

○ ○ ○ ○ ○ ○ ○ ○ ○ ○ ○
0   1   2   3   4   5   6   7   8   9   10

SECOND RATING EXPLANATION <u>318</u>

SECOND RESPONSE QUESTION <u>320</u>

SECOND OPEN RESPONSE SPACE <u>322</u>

CONTACT BOX <u>324</u>    CONTACT INPUT FIELD <u>326</u>

*FIG. 3*

RECOMMENDING USER FEEDBACK WITH AUTOMATIC SCORING AND REASONING

BACKGROUND

The present invention relates generally to the field of computing, and more particularly to user feedback.

Software is generally in a state of flux; requiring frequent updates for security, bug fixes, new features, and refinements, software is constantly subject to new bugs, and in need of feedback for new bug fixes, new features, and improvements to the user interface or functionality. Accordingly, obtaining feedback from users is often crucial to the continued improvement of a software product. Feedback forms are often used to obtain such feedback from users according to various criteria, which are often represented by numerical ratings or text-based fields, and measure ease of use, customer loyalty, recommendation rate, or any other useful information. Such user feedback systems need not be limited to software systems, and may be used in any field where user or customer feedback is desired.

SUMMARY

According to one embodiment, a method, computer system, and computer program product for recommending feedback for a feedback form is provided. The embodiment may include collecting data about a user's experience of an application. The embodiment may also include analyzing the collected data to determine one or more suggested responses to one or more questions in a feedback form. The embodiment may further include preparing the feedback form for the user based on the suggested responses. The embodiment may also include presenting the prepared feedback form to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment.

FIG. 3 illustrates an exemplary feedback form.

DETAILED DESCRIPTION

Figure 2:
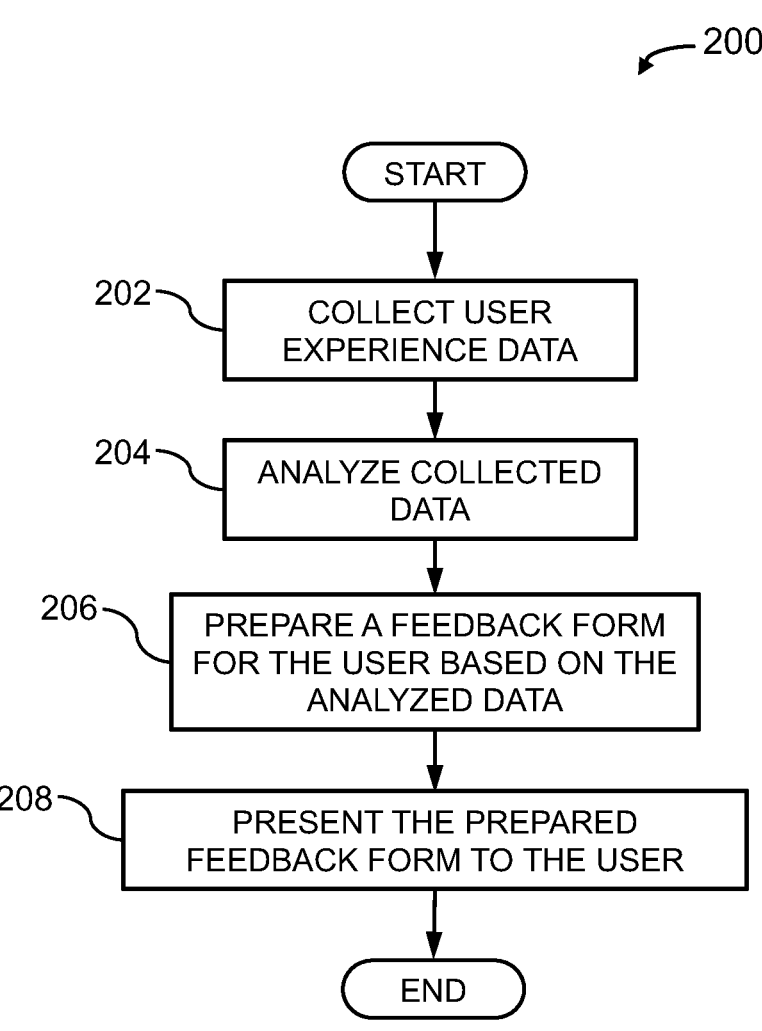
FIG. 2 illustrates an operational flowchart for a process for generating and recommending responses to a feedback form.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to user feedback. The following described exemplary embodiments provide a system, method, and program product to, among other things, generate and recommend feedback for a user feedback form. Therefore, the present embodiment has the capacity to improve the technical field of memory management by providing users with recommended feedback and customized forms in order to simplify their experience and ensure consistent responses.

As previously described, software is generally in a state of flux; requiring frequent updates for security, bug fixes, new features, and refinements, software is constantly subject to new bugs, and in need of feedback for new bug fixes, new features, and improvements to the user interface or functionality. Accordingly, obtaining feedback from users is often crucial to the continued improvement of a software product. Feedback forms are often used to obtain such feedback from users according to various criteria, which are often represented by numerical ratings or text-based fields, and measure ease of use, customer loyalty, recommendation rate, or any other useful information. Such user feedback systems need not be limited to software systems, and may be used in any field where user or customer feedback is desired.

Since different users may use different features, existing feedback forms may need to select which features to focus on, or risk being too long for users to follow and respond to meaningfully. Furthermore, since feedback forms are not always presented immediately after features are used, users do not always remember their experiences with accuracy, or reflect on their opinions through objective or meaningful feedback. However, user feedback forms are most effective when feedback is accurate, consistent, objective, and meaningful. Users are, further, more likely to provide feedback if providing that feedback is made easy for them. As such, it may be advantageous to, by tracking usage data through opt-in procedures, generate a customized feedback form for a user, or recommended feedback for the user, representing feedback the user is likely to give.

According to one embodiment, a feedback recommendation program collects data about a user's experience in an application. The feedback recommendation program then analyzes the collected data for use in generating and recommending feedback. The feedback recommendation program then prepares a feedback form for a user based on the collected and analyzed data. Preparing a feedback form may include preparing a customized form or generating feedback for the form. In some embodiments, the feedback recommendation program may use collected and analyzed data to determine an optimal time with which to present the feedback form to a user. The feedback recommendation program then presents the prepared feedback form to the user.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as feedback recommendation program 150. In addition to feedback recommendation program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and feedback recommendation program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in feedback recommendation program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in feedback recommendation program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of the Bluetooth Special Interest Group and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The feedback recommendation program 150 may collect data about a user's experience in an application or environment. The feedback recommendation program 150 may further analyze the collected data. The feedback recommendation program 150 may then prepare a feedback form, such as by customizing the form itself or generating recommended feedback for the form, for a user based on the collected data. The feedback recommendation program 150 may then present the prepared feedback form for the user.

Furthermore, notwithstanding depiction in computer 101, feedback recommendation program 150 may be stored in and/or executed by, individually or in any combination, end user device 103, remote server 104, public cloud 105, and private cloud 106. The data management method is explained in more detail below with respect to FIG. 2.

Referring now to FIG. 2, an operational flowchart for a process for recommending user feedback 200 is depicted according to at least one embodiment. At 202, the feedback recommendation program 150 collects data about a user's experience in an application or environment. Data may be collected according to opt-in procedures. Collecting data may include collecting data from an application's usage, biometric data, data from input devices, metadata, or data from any other sources, particularly those relevant to the user or environment. Data may be collected and stored in any type of data repository and in any format.

An environment may include an application, or may, in alternate embodiments, include other environments for which user feedback may be desired. For example, an environment may include a retail store, a doctor's office, an ebook, or a television show. An environment may include more than one of these things; for example, an environment may include a doctor's office and a software system managing some features of a doctor's visit.

Collecting data may include collecting data from an application's usage, including, for example, information about which sections or features of an application are used and for how long, the options a user selects, data input by a user such as text, content viewed or interacted with by a user, any errors that are triggered through the user's usage, and the times at which these events occur.

Data may further be collected from input devices. Input devices may include typical input devices like a keyboard, mouse, trackpad, microphone, or webcam, either embedded in or communicatively coupled with a computing device running the feedback recommendation program 150. Input devices may further include specialized devices, such as biometric input devices like health and fitness trackers, or any other peripheral, Bluetooth®, or IoT device.

Data may include biometric data, including data collected from a biometric input device, such as heart rate data, or other data processed into biometric data at 204, such as visual data of a user collected through a webcam processed to extract visual footage of the user's eyes, further processed into eye-tracking data. Further examples of biometric data may include facial expressions, bodily actions or gestures, motion tracking or motion capture, galvanic skin response, electrodermal activity, electromyography, blood pressure, heart rate or heartbeat, voice pitch, voice volume, voice speed, or content of speech.

Data may include metadata, such as data about the time at which a piece of data is created or collected; data about the device from which the data is created or collected such as its operating system, technical specifications, or model number; the user logged into the device at the time the data is created or collected; the size of the data on a computer readable medium as may be measured in bytes; a location at which the data is created or collected; or any other information useful in describing or identifying any other data or metadata.

Data may be collected from any other sources. For example, in the context of a doctor's office, data may be collected from medical records or any other information collected by a health professional. Alternatively, data may be collected from public or private APIs, social media, or any other known source of information or method for gathering information. As yet another example, collected data may include data from an operating system or a containing application such as a web browser, including data from a plugin, a user profile, or an autocomplete API.

Data may be collected and stored in any type of data repository and in any format that is sufficient to serve the process for recommending user feedback 200. Collecting data may include any known methods of storing, securing, encrypting, compressing, processing, authenticating, or communicating data.

Collecting data may include collecting data analyzed at 204; accordingly, any reference to collected data, or making determinations based on collected data, may include making determinations based on analyzed data or a combination thereof. Data may continue to be collected at any point in the process for recommending user feedback 200. Data may further include feedback collected at 208 or at any other stage, for example for machine learning purposes.

Data may be collected at any time, over time, in between other steps, across other steps, or parallel to any other step. The feedback recommendation program 150 may collect data from multiple streams, devices, or users simultaneously.

Then, at 204, the feedback recommendation program 150 analyzes collected data. Analyzing data may include processes of artificial intelligence ("AI") or any other known method of data analysis. Analyzing may specifically include estimating feedback scores, generating meaningful feedback, or analyzing usage patterns over time.

In at least one embodiment, analyzing data may include a process of AI, including a process of training and utilizing a machine learning model. AI techniques may specifically include natural language processing ("NLP"), speech to text, large language models ("LLMs"), deep learning, supervised learning, unsupervised learning, artificial neural networks, sentiment analysis, or image or video analysis.

Other methods of data analysis may include, for example, statistical analysis, correlating different points of data, removing unnecessary data, non-AI-based NLP techniques such as measuring word frequency, or non-AI-based image or video processing. For example, processing may include identifying relevant times of a video that correspond to the time when a user used a key feature and removing irrelevant portions of the video.

Analyzing biometric data may include specific techniques for analyzing such biometric data. For example, the feedback recommendation program 150 may have a dedicated module for analyzing electrodermal activity, and another module for performing sentiment analysis based on, and using a machine learning algorithm trained on, pitch, speed, and volume of voice data.

Analyzing may include determining responses to one or more questions, including a feedback score or rating, meaningful feedback such as a text-based response, or other discrete responses.

Analyzing may include determining one or more estimated feedback scores. For example, analyzing data regarding an application may include processing data to determine a likelihood, for each of several IoT devices, that a user will recommend the application in use to a friend; composing each likelihood measured for each IoT device into one likelihood rating, either as a simple mean or a weighted mean, weighted, for example, by a confidence rating or relevance rating of the particular IoT device's data; determining an overall likelihood based on the combined data through any other means; or determining, through any of these means, a score the user is likely to assign to a question in a user feedback form asking how likely a user is to recommend the application to a friend. Determining a score may further be performed by determining a base score or initial score, and modifying the score based on performance, errors encountered, and other user experience modifiers. Scores may be calculated for a data set or stream, a recording device, a feature, a user, a time frame, or any combination of these dimensions, composed together in any way, or left separate.

Analyzing may further include generating meaningful sample feedback, such as text-based feedback, for prepopulating in a feedback form or otherwise recommending to a user. The meaningful feedback may reflect reasoning for why a certain score was assigned. For example, analyzing may include a process of natural language generation utilizing an LLM or a machine learning algorithm trained on previous feedback, or any other natural language processing technique. Analyzing may further include determinations about the user's experience, such as determinations that a user stopped using an application eight times, each time in response to the same bug, and the user's heart rate increased each time the bug occurred, by an increasing amount each time, and, accordingly, that the bug was very frustrating for the user. Reasoning may be determined through the operation of an AI algorithm used to determine a score if the AI algorithm includes a function that provides evidence of how it reaches its conclusion. Reasoning may be modified according to a score determined above. Alternatively, reasoning may be modified in response to a user changing a score; for example, if the feedback recommendation program 150 recommends a score of 5 out of 10, and the user instead selects a score of 9 out of 10, analyzing may include recommending new reasoning that better explains the score of 9 out of 10.

Alternatively, analyzing may include determining responses to preexisting, modified, or generated questions from a user feedback form that involve a selection between discrete responses, or any other type of question that may be used on a feedback form. For example, if a question asks, "which is your favorite feature?" and offers a selection between four different features, analyzing may include selecting a feature from the four features.

Analyzing may also include generating or modifying questions in the process of preparing a feedback form at 206. Furthermore, questions on the form may include logic, rules, or guidelines for responses, and determining the appropriate response may include following the logic, rules, or guidelines. For example, a series of five scored options may ask the user to rank the options by assigning a distinct score from 1-5 for each, determining responses may include understanding that the scores represent a ranking and that the same score may not be used twice. As another example, if a question asks for a text response from 25-1000 characters long, determining may include generating a response that follows that guideline, or a response designed so that a user's ultimate response is likely to still follow the guideline (for example by limiting the response to 800 characters so that users can add some text.

Analyzing may further include analyzing usage patterns over time. For example, analyzing may include constructing a scatter plot of a user's usage frequency by time of day (continuously, at specific times, or within predetermined time intervals) to statistically model the times a user is most likely to stop using the software; calculating a mean or median usage frequency (overall or over a period of time); or determining an angle or slope of usage frequency over time compared to a baseline (such as a mean) to determine the likelihood that a user will continue to use the application in the near future.

Determining an angle or slope may include calculating the tangent of an angle created by two nearby points on a scatter plot (where 0 degrees or 0 radians may represent time moving forward along a horizontal axis, angles ranging between 0 and 90 degrees may represent an increasing usage frequency over time, and angles ranging between 270 and 360 degrees, or between-90 and 0 degrees, may represent a decreasing usage frequency over time); calculating the slope created by a line drawn between two points on a scatter plot; mapping a curve over the scatter plot, such as by regression, and calculating the slope of a tangent of that curve, such as by derivative calculus.

Analyzing may include determining a good time to provide a user with a feedback form at 208, for example based on analyzed usage patterns. Determining a good time may include determining a time when a user's experience is least likely to be interrupted, a time when the user is likely to meaningfully remember the experience on which the user is commenting, a time when the user is most likely to respond, or a time when the user is most likely to provide meaningful or useful feedback of any particular nature. For example, a good time may be any time when the slope of a user's likely usage trajectory is pointed downward (as characterized by a slope, angle, or tangent of an angle), crosses the mean threshold of the user's usage patterns, the user has not experienced an unusually high number of errors in the past two hours, the user is using a device on which they prefer to fill out surveys or a device on which they tend to provide longer written feedback, and in a preferred location like the user's office or home.

Analyzed data may be collected at 202; accordingly, any data referred to as collected data may further include analyzed data. The feedback recommendation program 150 may analyze analyzed data; for example, the feedback recommendation program 150 may process a video to extract eye tracking data, and further process the eye tracking data using machine learning.

Data may be analyzed at any time, over time, in between other steps, across other steps, parallel to any other step, continuously, or in response to any other event. The feedback recommendation program 150 may analyze data on multiple devices or through multiple data streams simultaneously.

Next, at 206, the feedback recommendation program 150 prepares a feedback form for a user or other potential respondent based on the collected data or, particularly, on the analyzed data. A feedback form may be a survey or similar instrument for collecting opinions or feedback. Preparing a feedback form may include generating or modifying a preexisting feedback form, generating or applying generated scores or generated content to a preexisting feedback form or a generated or modified feedback form, or generating a feedback form entirely through the process for recommending user feedback 200. A user may be any individual who might provide feedback, including a user of a software application or any individual who opted into data collection at 202. Preparing a feedback form may, for example, serve the function of recommending feedback to a user, assisting the user in filling out the form, or improving the relevance or effectiveness of the feedback.

A question need not be a grammatical question, but may be any query, guideline, tooltip, or item on a form or survey, in particular one that requests a response. Common questions may be used to elicit feedback about user experience factors such as ease of use, customer loyalty, recommendation rate, or any other useful information through, for example, questions asking a user to rate their experience, the likelihood that they will use the relevant product, application, or service again, the likelihood that they will recommend the relevant product, application, or service in the future, questions asking users to explain their ratings, questions asking the user to request or recommend new features, questions asking about bugs or errors in a piece of software, or open-ended questions asking for user feedback or input generally. Questions may relate to existing standards or systems for surveys. For example, a question asking about the likelihood that they will recommend the relevant product, application, or service in the future may function as a Net Promoter® (Net Promoter and all Net Promoter-based trademarks and logos are trademarks or registered trademarks of Bain & Company Inc., Fred Reichheld, NICE Systems Inc., and/or their affiliates) question.

Preparing a feedback form may include generating or modifying an existing feedback form, such as by removing, adding, or modifying questions on the form. A form may be modified to increase the likelihood that a user responds with useful or meaningful feedback; to use less of the user's time; to ask questions about features a user actually used; to ask about bugs a user encountered; to ask questions about features the user may meaningfully remember; to ask questions in a format that may remind users of their experience; to assist in accessibility or convenience.

Modifying a form may further include, for example, adding tooltips or explanations to a form, changing the visual design of a form such as a light theme or dark theme or increased font size, modifying a submission button, modifying tone or dialect or language to a format a user will appreciate or understand more, providing audio assistance reading questions on the form (as through text-to-speech or other known methods), or modifying any other presentation feature described at 208. Modifying may further include adding, removing, or changing the logic, rules, or guidelines for a question, a set of questions, or the form overall.

In further embodiments, modifying a form may include changing the medium or format of a form altogether, such as from a web form built into a web application into an email-based form. Preparing or modifying a form may further include whether a form should be long or short, should be pre-populated fully with recommended responses to each question, should be prepared minimally leaving most questions for the user to answer, should be left blank for a particular user who prefers to fill out questionnaires from a blank state, or prepared according to any other style or format.

In at least one embodiment, preparing a form may include generating or applying generated feedback score recommendations to an existing feedback form or a generated or modified feedback form. Scores may be applied on any scale, including a five-point, ten-point, or hundred-point scale, or a scale not measured by numerical scores. Any discrete option or response may be applied to a question demanding a discrete option or response. Discrete options may include any options selectable as input, including a selection through radio buttons or drop-down menus, specialized input fields such as date fields or color-picker fields, or a text-input field with instructions to enter input from a set of discrete input options.

Furthermore, preparing a form may include generating or applying generated content to an existing feedback form or a generated or modified feedback form. Applying generated content may include pre-populating the content. For example, a question asking a user to explain their score for the previous question may be filled with text, which may be presented at 208 as a normal color and shade, or a special color and shade to indicate that it was pre-populated. Alternatively, applying generated content may include using generated content as a tooltip, such as a tooltip that appears when a user hovers over a question mark, or a tooltip that appears as gray text in a text field but disappears once the text field is selected.

Preparing a feedback form may include an option to request a reminder, such as through a time and date input field. A reminder may be used to set a date at which to present the form to the user again. Alternatively, a date field may be used for a user to request that they not be presented with the feedback form too often, for example, asking to not be reminded to fill out the form for at least 30 days, or not be asked to fill out a feedback form for at least one year after submitting a feedback form. A user may submit one of these requests separately from submitting a form, and the feedback recommendation program 150 may save or store the prepared form, or a form as partially filled out, and may save any collected or analyzed data to assist at the date of the reminder. A form may be prepared or re-prepared in such a way as to remind the user of features they may have forgotten by the time of the reminder.

A form, or any portion of a form, may be prepared or re-prepared at any point, including throughout the process of analyzing data at 204, or even while the form is being filled out after it is provided at 208. For example, some fields of the prepared form may be modified in response to a user modifying their score, such as an explanation changing from mostly positive to mostly negative if a user modifies a score from an eight out of ten to a three out of ten. As another example of applying generated content, a response may be generated and applied in response to a user's text input as it is entered, for an advanced form of auto-completion. The feedback recommendation program 150 may fill out any number of forms in parallel or simultaneously.

Then, at 208, the feedback recommendation program 150 presents the prepared feedback form to the user. A feedback form may be presented at a time or in a manner determined according to analyzed data. A feedback form may be presented through any format or medium in which it is prepared, including as a new page, a popup, an email, or a Universal Resource Identifier ("URI"), button, or similar element directing a user to a form of another format. Presenting a feedback form may include presenting a feedback form again at a future date.

A feedback form may be presented at a time or in a manner determined according to analyzed data, or according to a reminder, and may be presented any number of times. A feedback form may simply be presented once a user is done using a product, service, application, or feature. Alternatively, a form may be presented in response to complex determinations based on analyzed data, including, for example, usage patterns over time or usage trajectory in terms of the angles described at 204, or according to the complex examples described as 204. As another example, the feedback recommendation program 150 may track usage over time relative to when different features are used, and may project usage directory based on usage patterns before and after each of separate features are used in order to identify a "late feature" that people tend to use last, such as an "export" feature, and identify a timing with which a user is most likely to respond to a survey after using the "late feature" without having their experience interrupted.

A feedback form may be presented through any format or medium in which it is prepared, including as a new page, a popup, an email. Alternatively, presenting a feedback form may include presenting a URI, button, or similar element directing a user to a form of another format. For example, presenting a prepared feedback form may include presenting an unfilled feedback form with an autofill button where, upon the user pressing the autofill button, prepared responses prepared at 206 are populated into, for example, yet-unfilled sections of the form. Presenting a feedback form may also include presenting an intermediate form asking the user for contact information to email a full form to, allowing the user to set a reminder or select a good time to fill out the form, or allowing the user to select features about which they would like to be surveyed.

In alternate embodiments, a feedback form may be presented to another user besides the user for whom it is prepared. For example, a feedback form may be presented to a user's teammate or support staff to fill out on the user's behalf, or to an administrative user to review the prepared form for any reason.

In some embodiments, a feedback form may be presented to a user at any time, such as during the collection or analysis of the data, or in parallel with the preparation of the form.

The feedback recommendation program 150 may present any number of forms to any number of users.

The feedback recommendation program 150 may then additionally collect feedback through the feedback form, and may use the collected feedback for a variety of purposes, including for improving a product, application, or service, for example by providing the feedback to an administrative user, or compiling feedback into a statistical representation of scores and feedback such as a spreadsheet, a chart, an average, or a summary report.

Alternatively, feedback may be used to assist in training any type of machine learning model through any training method using various AI techniques, including, for example, an LLM; supervised learning; reinforcement learning; artificial neural networks including feedforward neural networks, deep neural networks, or long short-term memory; or any other training method or type of machine learning model or other relevant AI-related technique that may utilize or involve learning from feedback.

Collecting feedback may include collecting the prepared form, or a history of various versions of the prepared form; collecting the filled or completed form as submitted by the user; collecting metadata about the filling of the form such as a measurement of how long the user spent filling out the form, how many options the user changed, or what device the user used to fill out the form; or any other relevant data described above, or that may be used as feedback for any purpose.

Collecting feedback may further include collecting feedback from a user who receives feedback, such as feedback about the performance of the feedback recommendation program 150. For example, if a user receives five hundred feedback forms that were prepared without the process for recommending user feedback 200, and five hundred feedback forms that were prepared with the process for recommending user feedback 200, the user may provide feedback to the feedback recommendation program 150, stating that the feedback recommendation program 150 has a tendency to weigh small bugs too significantly in preparing feedback, has a tendency to result in lower scores than humans filling out the feedback form without the assistance of the feedback recommendation program 150, and causes users to provide more feedback about loading times. This type of feedback may be used for the same purposes as any other feedback above, but may be particularly useful for machine learning purposes. Additional feedback may be collected according to any other known method for collecting feedback or relevant data in the context of machine learning.

Collecting feedback may be performed concurrently with any other step, including while data is being analyzed, while forms are being prepared or presented, or while other data is being collected. The feedback recommendation program 150 may collect feedback through multiple forms or feedback streams simultaneously.

Referring now to FIG. 3, an exemplary feedback form 300 is depicted according to at least one embodiment. A feedback form may include a title, such as survey title 302; instructions and explanations, such as general instruction 304 or second rating explanation 318; and questions, such as questions 306, 310, 314, or 320. Responses to questions may be entered through various input fields, such as exclusive radio buttons 308 and 316, checkboxes, open response spaces 312 and 322, structured response spaces, or any other input field.

A feedback form may include features of the form such as general titles, such as survey title 302, or section titles, such as a section for each feature a user used; instructions and explanations, such as general instruction 304 or section; section separators; buttons such as exit buttons, undo buttons, submit buttons, next page buttons, previous page buttons, or autofill buttons; or any other UI element or feature.

An input form may include questions, including rating questions such as questions 306 and 314, or open response questions such as questions 310 and 320. Questions may have instructions or explanations such as second rating explanation 318. Questions may further have other features, such as response requirements. Response requirements may include a requirement that a user respond to a particular question, such as question 306, minimum or maximum requirements, such as a minimum or maximum amount of text that can be entered into a text input field, or complex requirements, such as format requirements for contact information, spam filtering rules, or a rule requiring a unique username or email address with a feature informing a user whether a username or email address is already in use. Requirements may be reflected in explanations or instructions, or through other UI elements such as asterisks.

Responses to questions may be entered through various input fields, such as exclusive radio buttons 308 and 316, which may be stacked vertically or horizontally and used for selecting no more than one option; checkboxes, which may be used for selecting any number of options; open response spaces 312 and 322, which may include long-form and short-form text fields or other open fields such as a canvas-type input field for drawing; structured response spaces, such as date- or time-picker fields; drop down menus; or any other input field. Input fields may be combined or nested. For example, a set of radio buttons or checkboxes may include an "other" option, which may include a short-form text input field. An instruction may appear near or even within an input field, such as by gray background text in unfilled text input fields.

A feedback form may include contact-related questions and input, as found in contact box 324, including one or more input fields for contact information, such as contact input field 326. Contact-related questions may be grouped together or separated. Contact information may be used for reminders, follow-ups, or other contacts. A user may request a reminder, for example by selecting a time for the reminder and a method by which to send the reminder.

A feedback form may be a preexisting unmodified feedback form, a preexisting feedback form modified by the feedback recommendation program 150 through modification of any of the above features or any other feature, a generated feedback form that is generated from scratch by the feedback recommendation program 150, or any such feedback form that is further prepared by the feedback recommendation program 150, such as by pre-populating recommended responses. A feedback form may be presented to a user, such as at 208.

It may be appreciated that FIGS. 2 and 3 each provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
collecting data about a user's experience of a software application, wherein collecting data includes collecting input data including inputs submitted by the user from an input device on a device while the user is engaged with the software application and collecting visual data of the user while the user is engaged with the software application on the device;
processing the input data and the visual data, wherein eye-tracking data is extracted from the visual data and the eye-tracking data is processed using machine learning, wherein processing the input data and the visual data includes synchronizing the input data and the processed eye-tracking data based on time to obtain time-stamps of the input data and eye-tracking data;
analyzing, using machine learning, the processed input data and visual data to obtain usage patterns of the user by calculating a mean usage frequency over a first time period and by calculating a slope of usage frequency over the first time period;
analyzing, by a machine learning model trained on historical user experience data associated with the software application, the collected data to determine one or more suggested responses to one or more questions in a feedback form based on the usage patterns of the user;
determining, by the machine learning model trained on historical user experience data associated with the software application, a timing for presenting the feedback form to the user based on the slope of usage frequency as compared to the mean usage frequency over the first time period;
preparing the feedback form for the user based on the suggested responses;
presenting the prepared feedback form to the user at the determined timing; and
training the machine learning model based on an elapsed time the user spent filling out the feedback form and a number of options within the feedback form that the user modified.

2. The method of claim 1, wherein the preparing includes pre-populating the feedback form with the suggested responses.

3. A computer system, the computer system comprising:
a processor set;
one or more computer readable storage media; and
program instructions stored on the one or more computer readable storage media to cause the processor set to perform operations comprising:
collecting data about a user's experience of a software application, wherein collecting data includes collecting input data including inputs submitted by the user from an input device on a device while the user is engaged with the software application and collecting visual data of the user while the user is engaged with the software application on the device;
processing the input data and the visual data, wherein eye-tracking data is extracted from the visual data and the eye-tracking data is processed using machine learning, wherein processing the input data and the visual data includes synchronizing the input data and the processed eye-tracking data based on time to obtain time-stamps of the input data and eye-tracking data;

analyzing, using machine learning, the processed input data and visual data to obtain usage patterns of the user by calculating a mean usage frequency over a first time period and by calculating a slope of usage frequency over the first time period;

analyzing, by a machine learning model trained on historical user experience data associated with the software application, the collected data to determine one or more suggested responses to one or more questions in a feedback form based on the usage patterns of the user;

determining, by the machine learning model trained on historical user experience data associated with the software application, a timing for presenting the feedback form to the user based on the slope of usage frequency as compared to the mean usage frequency over the first time period;

preparing the feedback form for the user based on the suggested responses;

presenting the prepared feedback form to the user at the determined timing; and training the machine learning model based on an elapsed time the user spent filling out the feedback form and a number of options within the feedback form that the user modified.

4. The computer system of claim 3, wherein the preparing includes pre-populating the feedback form with the suggested responses.

5. A device comprising:

a processor set;

one or more computer readable storage media; and program instructions stored on the one or more computer readable storage media to cause the processor set to perform operations comprising:

collecting input data including inputs submitted by a user from a mouse and from a keyboard communicatively coupled to the device while the user is engaged with a software application;

collecting, from a webcam of the device, visual data of the user while the user is engaged with the software application on the device;

processing the input data and the visual data, wherein eye-tracking data is extracted from the visual data and the eye-tracking data is processed using machine learning, wherein processing the input data and the visual data includes synchronizing the input data and the processed eye-tracking data based on time to obtain time-stamps of the input data and eye-tracking data;

analyzing, using machine learning, the processed input data and visual data to obtain usage patterns of the user by calculating a mean usage frequency over a first time period and by calculating a slope of usage frequency over the first time period;

analyzing, by a machine learning model trained on historical user experience data associated with the software application, the collected data to determine one or more suggested responses to one or more questions in a feedback form based on the usage patterns of the user;

determining, by the machine learning model trained on historical user experience data associated with the software application, a timing for presenting the feedback form to the user based on the slope of usage frequency as compared to the mean usage frequency over the first time period;

preparing the feedback form for the user based on the suggested responses;

presenting the prepared feedback form to the user; and training the machine learning model based on an elapsed time the user spent filling out the feedback form and a number of options within the feedback form that the user modified.

\* \* \* \* \*